United States Patent
Fairgrieve et al.

(10) Patent No.: US 9,657,833 B2
(45) Date of Patent: May 23, 2017

(54) SYSTEM AND METHOD FOR SELECTING A DRIVELINE GEAR RATIO

(71) Applicant: Jaguar Land Rover Limited, Whitley Coventry Warwickshire (GB)

(72) Inventors: Andrew Fairgrieve, Rugby (GB); Daniel Woolliscroft, Birmingham (GB); James Kelly, Solihull (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/421,918

(22) PCT Filed: Aug. 15, 2013

(86) PCT No.: PCT/EP2013/067083
§ 371 (c)(1),
(2) Date: Feb. 16, 2015

(87) PCT Pub. No.: WO2014/027065
PCT Pub. Date: Feb. 20, 2014

(65) Prior Publication Data
US 2015/0219210 A1  Aug. 6, 2015

(30) Foreign Application Priority Data

Aug. 16, 2012 (GB) .................................. 1214651.0
Mar. 15, 2013 (GB) .................................. 1304671.9

(51) Int. Cl.
*G06F 17/00* (2006.01)
*F16H 61/02* (2006.01)
(Continued)

(52) U.S. Cl.
CPC ......... *F16H 61/0213* (2013.01); *B60K 28/16* (2013.01); *B60K 31/02* (2013.01);
(Continued)

(58) Field of Classification Search
None
See application file for complete search history.

(56) References Cited

U.S. PATENT DOCUMENTS 4,660,672 A * 4/1987 Katou .................. B60K 31/047
                                           180/175
5,172,609 A * 12/1992 Nitz .................... F16H 61/0213
                                           477/129
(Continued)

FOREIGN PATENT DOCUMENTS

EP  2372195 A2  10/2011
JP  11051179     2/1999

OTHER PUBLICATIONS

International Search Report for application No. PCT/EP2013/067083, dated Jan. 2, 2014, 3 pages.
(Continued)

*Primary Examiner* — Dirk Wright
(74) *Attorney, Agent, or Firm* — Reising Ethington P.C.

(57) ABSTRACT

A method for selecting a gear ratio for a driveline of vehicle is provided. The method comprises gathering information relating to one or more parameters associated with the vehicle and anticipating, based on the gathered information, an occurrence of an event relating to the vehicle for which a change in driveline gear ratio is needed. The method further comprises identifying a suitable driveline gear ratio for the anticipated event, generating a command signal representative of a request to change the gear ratio of the driveline to the identified gear ratio, and communicating the command signal to a driveline subsystem of the vehicle. A system comprising an electronic control unit configured to perform the method is also provided.

21 Claims, 4 Drawing Sheets

(51) Int. Cl.
*B60K 28/16* (2006.01)
*B60K 31/02* (2006.01)
*B60K 31/04* (2006.01)
*B60T 8/175* (2006.01)
*B60W 30/14* (2006.01)
*F16H 59/66* (2006.01)
*F16H 61/04* (2006.01)
*F16H 59/44* (2006.01)
*F16H 61/16* (2006.01)
*B60W 10/11* (2012.01)
*B60W 10/111* (2012.01)

(52) U.S. Cl.
CPC ............. *B60K 31/04* (2013.01); *B60T 8/175* (2013.01); *B60W 30/14* (2013.01); *B60W 30/143* (2013.01); *B60W 30/146* (2013.01); *F16H 59/44* (2013.01); *F16H 59/66* (2013.01); *F16H 61/0437* (2013.01); *F16H 61/16* (2013.01); *B60T 2201/04* (2013.01); *B60T 2210/14* (2013.01); *B60T 2210/16* (2013.01); *B60T 2220/04* (2013.01); *B60T 2260/06* (2013.01); *B60W 10/11* (2013.01); *B60W 10/111* (2013.01); *B60W 2520/10* (2013.01); *B60W 2520/26* (2013.01); *B60W 2550/141* (2013.01); *B60W 2710/1005* (2013.01); *B60W 2720/30* (2013.01); *B60Y 2200/20* (2013.01); *F16H 2061/0216* (2013.01); *F16H 2061/0234* (2013.01)

(56) References Cited

U.S. PATENT DOCUMENTS

| | | | | |
|---|---|---|---|---|
| 5,241,476 A * | 8/1993 | Benford | ............. | F16H 61/0213 477/120 |
| 5,272,939 A * | 12/1993 | Markyvech | ............. | F16H 59/14 477/120 |
| 5,479,345 A * | 12/1995 | Amsallen | ............ | F16H 61/0213 701/59 |
| 5,489,247 A * | 2/1996 | Markyvech | ......... | F16H 61/0403 477/120 |
| 5,508,916 A * | 4/1996 | Markyvech | ........... | B60W 10/06 192/3.55 |
| 5,566,072 A * | 10/1996 | Momose | ................. | B60T 8/174 701/117 |
| 5,685,799 A * | 11/1997 | Vukovich | ............... | F16H 61/10 477/148 |
| 5,741,202 A * | 4/1998 | Huber | ................... | B60W 10/06 477/110 |
| 5,830,104 A * | 11/1998 | Desautels | ............. | B60W 10/06 477/109 |
| 5,832,400 A * | 11/1998 | Takahashi | .............. | B60K 31/00 701/53 |
| 5,876,302 A * | 3/1999 | Palmeri | ................. | B60W 30/18 477/111 |
| 5,895,435 A * | 4/1999 | Ohta | ................... | F16H 61/0213 477/120 |
| 5,899,953 A * | 5/1999 | Urahashi | ............... | B60W 10/06 340/988 |
| 5,980,424 A * | 11/1999 | Huber | ................... | B60W 10/06 477/109 |
| 5,983,154 A * | 11/1999 | Morisawa | ............... | F16H 59/66 701/533 |
| 5,984,828 A * | 11/1999 | Huber | ................ | F16H 61/0213 477/142 |
| 6,015,366 A * | 1/2000 | Markyvech | ........... | B60W 10/06 477/107 |
| 6,070,118 A | 5/2000 | Ohta et al. | | |
| 6,085,137 A * | 7/2000 | Aruga | ..................... | F16H 59/66 477/120 |
| 6,126,570 A * | 10/2000 | Bohm | ................... | B60W 10/06 477/107 |
| 6,182,000 B1 * | 1/2001 | Ohta | ................... | B60K 31/0058 180/170 |
| 6,199,001 B1 * | 3/2001 | Ohta | ................... | B60K 31/0058 701/409 |
| 6,208,927 B1 * | 3/2001 | Mine | ................... | B60K 31/0058 701/70 |
| 6,209,408 B1 * | 4/2001 | DeJonge | ............... | F16H 59/044 74/335 |
| 6,223,118 B1 * | 4/2001 | Kobayashi | ......... | B60K 31/0008 701/54 |
| 6,246,941 B1 * | 6/2001 | Sayman | ................ | B60W 10/06 477/109 |
| 6,272,416 B1 * | 8/2001 | Kuroda | ................... | B60T 13/74 180/170 |
| 6,278,928 B1 * | 8/2001 | Aruga | ..................... | F16H 59/66 477/97 |
| 6,349,253 B1 * | 2/2002 | Bellinger | ............... | B60W 10/06 477/115 |
| 6,352,492 B1 * | 3/2002 | Steeby | .................. | B60W 10/06 477/109 |
| 6,427,108 B1 * | 7/2002 | Kanasugi | ............. | B60K 28/165 477/118 |
| 6,480,774 B1 * | 11/2002 | Snow | .................... | F16H 61/0213 474/69 |
| 6,496,771 B2 * | 12/2002 | Hattori | ............... | B60K 31/0008 340/435 |
| 6,513,610 B2 * | 2/2003 | Ochiai | ............... | B60K 31/0008 180/176 |
| 6,516,261 B2 * | 2/2003 | Ohashi | .................... | F16H 59/66 477/120 |
| 6,577,938 B1 | 6/2003 | Bellinger et al. | | |
| 6,626,797 B2 * | 9/2003 | Shiiba | .................... | F16H 59/66 477/901 |
| 6,634,989 B2 * | 10/2003 | Yu | ....................... | F16H 61/0437 477/143 |
| 6,834,224 B2 * | 12/2004 | Shiiba | .................... | F16H 61/16 477/34 |
| 7,146,264 B2 * | 12/2006 | Bates | .................... | F16H 61/0213 340/5.1 |
| 7,177,743 B2 * | 2/2007 | Roy | ....................... | B60W 50/06 701/36 |
| 7,194,348 B2 * | 3/2007 | Wada | ...................... | F16H 61/08 477/107 |
| 7,469,178 B2 * | 12/2008 | Shiiba | .................. | B60W 10/115 477/40 |
| 7,472,010 B2 * | 12/2008 | Thomson | .............. | B60W 30/18 477/1 |
| 7,734,404 B2 * | 6/2010 | Shiiba | ................ | B60K 31/0066 303/121 |
| 8,050,834 B2 * | 11/2011 | Kondou | ................ | B60W 10/06 701/51 |
| 8,099,220 B2 * | 1/2012 | Kim | ................... | F16H 61/0213 477/97 |
| 8,121,763 B2 * | 2/2012 | Hou | .................. | B60W 30/1882 701/51 |
| 8,306,707 B2 * | 11/2012 | Zhang | ..................... | F16H 47/02 180/165 |
| 8,392,079 B2 * | 3/2013 | Oda | ..................... | B60W 10/06 477/107 |
| 8,498,795 B2 * | 7/2013 | Eriksson | ............... | B60W 10/08 123/236 |
| 8,670,907 B2 * | 3/2014 | Kondou | ................ | B60W 10/06 180/271 |
| 8,788,424 B2 * | 7/2014 | Etchason | ............ | F16H 61/0213 477/5 |
| 8,818,650 B2 * | 8/2014 | Friend | .................. | A01B 69/003 701/50 |
| 9,014,931 B2 * | 4/2015 | Palmer | ................. | B60W 10/11 701/51 |
| 9,026,343 B2 * | 5/2015 | Mays | .................... | B60W 10/06 701/110 |
| 9,067,579 B2 * | 6/2015 | Eriksson | ............... | B60W 10/02 |
| 9,067,604 B2 * | 6/2015 | Noumura | ............... | B60W 10/06 |
| 9,085,293 B2 * | 7/2015 | Maier | ................ | F16H 61/0213 |

(56) References Cited

U.S. PATENT DOCUMENTS

| | | | |
|---|---|---|---|
| 9,182,035 B2* | 11/2015 | Jeong | F16H 61/0204 |
| 9,272,621 B2* | 3/2016 | Sujan | B60K 31/00 |
| 2006/0111830 A1 | 5/2006 | Higashi et al. | |
| 2008/0234905 A1* | 9/2008 | Steen | F16H 59/66 |
| | | | 701/65 |
| 2011/0190993 A1 | 8/2011 | Eriksson et al. | |
| 2014/0142822 A1* | 5/2014 | Li | F16H 61/00 |
| | | | 701/55 |

OTHER PUBLICATIONS

UK Combined Search and Examination Report for corresponding application No. 1304671.9, dated Sep. 4, 2013, 8 pages.

Written Opinion for application No. PCT/EP2013/067083, dated Jan. 2, 2014, 6 pages.

\* cited by examiner

SYSTEM AND METHOD FOR SELECTING A DRIVELINE GEAR RATIO

TECHNICAL FIELD

The present disclosure relates generally to vehicle speed control, and more particularly, to a system and method for selecting a gear ratio for a vehicle driveline.

BACKGROUND

Conventional or current off-road capable vehicles are typically provided with a powertrain comprising a propulsion mechanism that may comprise, for example, an engine (e.g., internal combustion engine), an electric motor, and/or a combination of both. These vehicles also include a driveline, which may comprise a multi-ratio transmission or gearbox, typically in the form of m automatic gearbox, among other components. In a typical arrangement, the transmission changes gears, and therefore, the gear ratio, when a prescribed difference between input and output shaft speed is detected and where the driveline torque exceeds a prescribed threshold.

When a change in the gear ratio is required in vehicles arranged in the above-described manner, there is a response time associated with the detection by the transmission that such a change should be made, and also a time associated with actually making the change. These time delays, either alone or in combination, may adversely affect vehicle composure, If a gear ratio change is required during the negotiation of, for example, an obstacle or other rugged terrain, or a steep incline.

Accordingly, there is a need for a system and a method that minimizes and/or eliminates one or more of the above-identified deficiencies.

SUMMARY

According to an embodiment, there is provided a method for selecting a gear ratio of a vehicle driveline. The method comprises: gathering information relating to one or more parameters associated with the vehicle; anticipating, based on the gathered information, an occurrence of an event relating to the vehicle for which a change in driveline gear ratio is needed; identifying a suitable driveline gear ratio for the anticipated event; generating a command signal representative of a request to change the gear ratio of the driveline to the identified gear ratio; and communicating the command signal to a driveline subsystem of the vehicle.

According to another embodiment, there is provided a method for selecting a gear ratio for a vehicle driveline. The method comprises: gathering information relating to one or more parameters associated with the vehicle; predicting, based on the gathered information, a need for a change in the gear ratio of the driveline from a current first gear ratio to a second gear ratio; and effecting the change to the driveline gear ratio to the second gear ratio in response to the predicted need to do so.

According to a further embodiment there is provided a system for selecting a gear ratio for a vehicle driveline. The system comprises an electronic control unit, configured to: receive information relating to one or more parameters associated with the vehicle; predict, based on the gathered information, a need for a change in the gear ratio of the driveline from a current first gear ratio to a second gear ratio; and effect the change in the driveline gear ratio to the second gear ratio in response to the predicted need to do so.

DESCRIPTION OF THE DRAWINGS

One or more embodiments of the invention will now be described, by way of example only, with reference to the following figures in which.

DETAILED DESCRIPTION

The system and method described herein may be used to control various operating parameters of a vehicle, such as, for example, vehicle speed and the gear ratio of a driveline of the vehicle (e.g., the gear ratio of a transmission or gearbox, or a transfer case). In one embodiment the present system and method gather information relating to one or more parameters associated with the vehicle, and predict, based on the gathered information, a need for a change in the gear ratio of the driveline from a current first gear ratio to a second gear ratio. The method and system further proactively change the driveline gear ratio to the second gear ratio in response to the predicted need to do so.

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function blocks is made for ease of explanation of the manner of operation of a control system according to an embodiment of the present disclosure.

Figure 1:
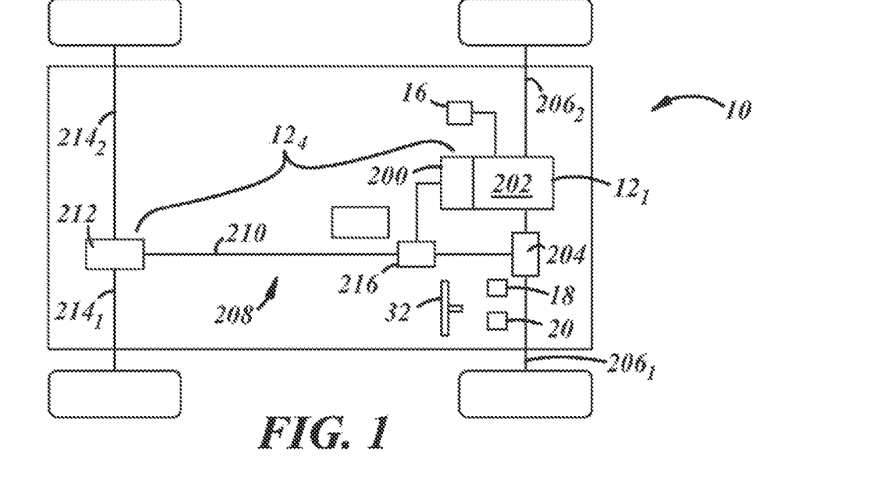
FIG. 1 is a schematic and block diagram of a vehicle.
Figure 2:
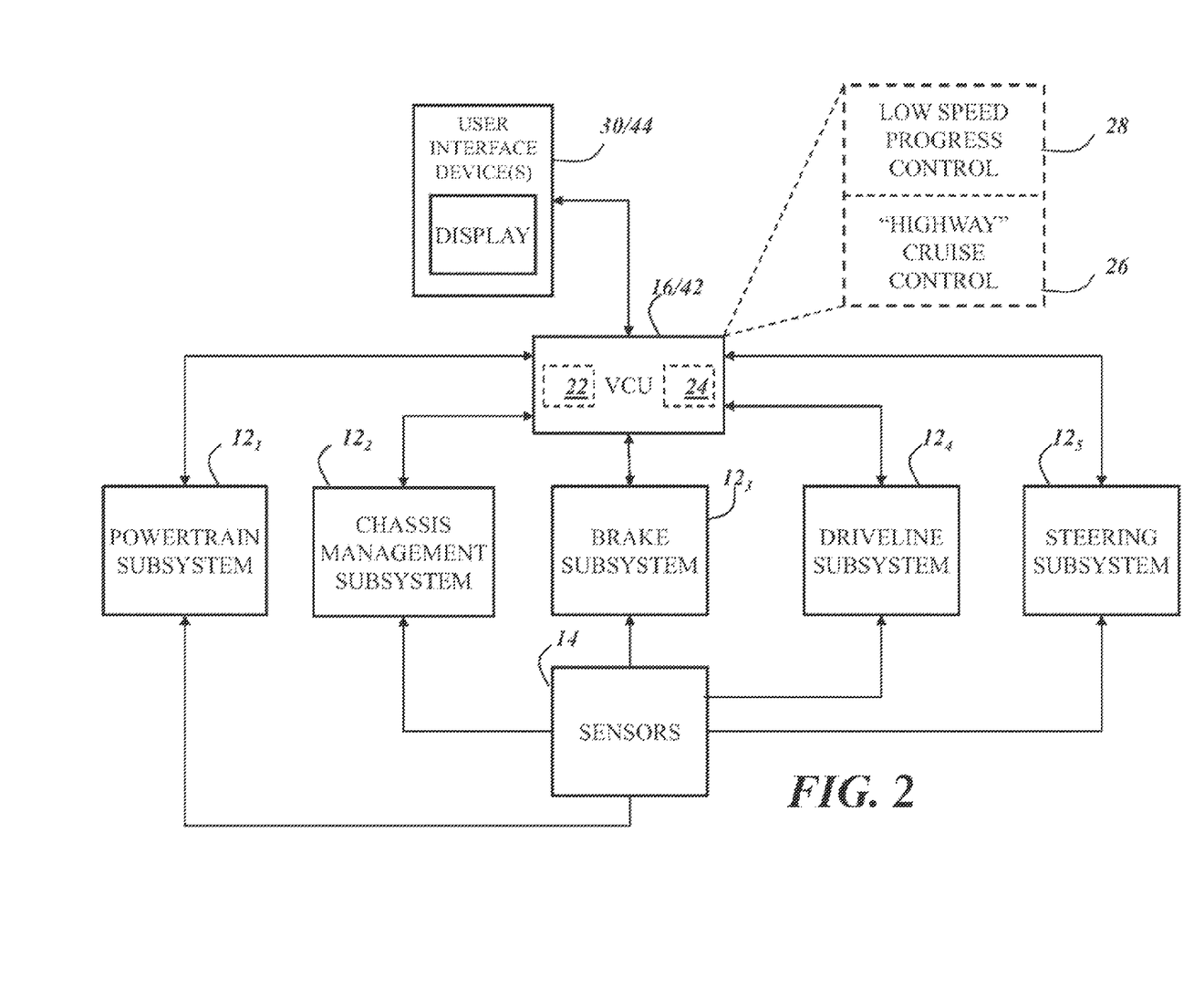
FIG. 2 is another block diagram of the vehicle illustrated in FIG. 1.

With reference to FIGS. 1 and 2, there are shown some of the components of a vehicle 10, with which the present method and system may be used. Although the following description is provided in the context of the particular vehicle 10 illustrated in FIGS. 1 and 2, it will be appreciated that this vehicle is merely an example and that other vehicles may certainly be used instead. For instance, in various embodiments, the method and system described herein may be used with any type of vehicle having an automatic, manual, or continuously variable transmission, including traditional vehicles, hybrid electric vehicles (HEVs), extended-range electric vehicles (EREVs), battery electrical vehicles (BEVs), passenger oars, sports utility vehicles (SUVs), cross-over vehicles, and trucks, to cite a few possibilities. According to one embodiment, vehicle 10 generally includes a plurality of subsystems 12, a plurality of vehicle sensors 14, and a vehicle control unit 18 (VCU 16), among any number of other components, systems, and/or devices not illustrated or otherwise described herein.

Subsystems 12 of vehicle 10 may be configured to perform or control various functions and operations relating to vehicle 10 and, as illustrated in FIG. 2, may include any number of subsystems 12. One such subsystem is a powertrain subsystem $12_1$. As is well known in the art, powertrain subsystem $12_1$ is configured to generate power or torque that is used to propel the vehicle. The amount of torque generated by the powertrain subsystem may also be adjusted so as to control the speed of the vehicle (e.g., to increase the speed of vehicle 10, the torque output is increased). The amount of torque that a powertrain subsystem is capable of outputting is dependent upon the particular type or design of the subsystem, as different powertrain subsystems have different maximum output torque capacities. In one embodiment, however, the maximum output capacity of powertrain subsystem $12_1$ of vehicle 10 may be in the order of 600 Nm. As is known in the art, powertrain output torque may be measured using one or more of vehicle sensors 14 described below (e.g., an engine torque sensor or a driveline torque sensor) or other suitable sensing means and may be used for a variety of purposes by one or more components, modules, or subsystems of vehicle 10, in addition to powertrain subsystem $12_1$, including, for example and without limitation, one or more of those described below. Those having ordinary skill in the art will appreciate that powertrain subsystem $12_1$ may be provided according to any number of different embodiments, may be connected in any number of different configurations, and may include any number of different components, like output torque sensors, control units, and/or any other suitable components known in the art. Accordingly, the present disclosure is not limited to any one particular powertrain subsystem.

Vehicle 10 may also include a chassis control or management subsystem $12_2$. Chassis management subsystem $12_2$ may be configured to perform, or may be configured to contribute to the performance of, a number of important functions, including those relating to, for example, traction control (TC), stability control systems (SCS) such as dynamic stability control (DSC), hill descent control (HDC), and steering control, to name only a few. To that end, and as is well known in the art, chassis management subsystem $12_2$ is further configured to monitor and/or control a variety of aspects or operational parameters of the vehicle using, for example, readings, signals, or information it receives from one or more of sensors 14 and/or other vehicle subsystems 12 described or identified herein. For example, subsystem $12_2$ may be configured to receive readings or other information relating to the pressure of the tyres of the vehicle from, for example, tyre pressure sensors associated with each tyre. As such, chassis management subsystem $12_2$ may monitor the tyre pressure and, if necessary, and if the vehicle is so configured, to automatically make, or cause to be made, adjustments to the pressure using an air compressor onboard the vehicle. Similarly, chassis management system $12_2$ may also be configured to receive readings or other information relating to the ride height of the vehicle from, for example, one or more air suspension sensors that may be distributed about the vehicle. In such an instance, chassis management subsystem $12_2$ may monitor the ride height of the vehicle and, if necessary, and if the vehicle is so configured, to automatically make, or cause to be made, adjustments to the ride height using and air compressor (suspension compressor) onboard the vehicle. Chassis management subsystem $12_2$ may further be configured to monitor the attitude of the vehicle. More particularly, subsystem $12_2$ may receive readings or information from one or more of sensors 14 and/or subsystems 12 described or identified herein to evaluate the pitch, roll, and yaw of the vehicle, and therefore, the overall attitude of the vehicle. In each instance, the information received or determined by chassis management subsystem $12_2$ may be utilized solely thereby, as described above, or may alternatively be shared with other subsystems 12 or components (e.g., VCU 16) of vehicle 10 which may use the information for any number of purposes. While only a few examples of operational parameters and/or aspects of the vehicle that chassis management subsystem $12_2$ may monitor and/or control have been provided, it will be appreciated that subsystem $12_2$ may be configured to control and/or monitor any number of other or additional parameters/aspects of vehicle 10 in the same or similar manner as that described above. As such, the present disclosure is not limited to the control and/or monitoring of any particular parameters/aspects. Moreover, it will be further appreciated that chassis management subsystem $12_2$ may be provided according to any number of different embodiments and may include any number of different components, like sensors, control units, and/or any other suitable components known in the art. Accordingly, the present disclosure is not limited to any one particular chassis management subsystem Yet another example of subsystem of vehicle 10 is a driveline subsystem $12_4$. As is known in the art, and as is illustrated in FIG. 1, driveline subsystem $12_4$ may include a multi-ratio transmission or gearbox 200 that is mechanically coupled with an output shaft of a propulsion mechanism of powertrain subsystem $12_1$ (e.g., an engine or electric motor of powertrain subsystem $12_1$, which is identified as reference number 202 in FIG. 1). Transmission 200 is arranged to drive the front wheels of vehicle 10 by means of a front differential 204 and a pair of front drive shafts $206_1$, $206_2$. In the illustrated embodiment, driveline subsystem $12_4$ also comprises an auxiliary driveline portion 208 arranged to drive the rear wheels of vehicle 10 by means of an auxiliary driveshaft or prop-shaft 210, a rear differential 212, and a pair of rear drive shafts $214_1$, $214_2$. In various embodiments, driveline subsystem $12_4$ may be arranged to drive only the front wheels or the rear wheels, or selectable two wheel drive/four wheel drive vehicles. In an embodiment such as that illustrated in FIG. 1, transmission 200 is releasably connectable to the auxiliary driveline portion 208 by means of a transfer case or power transfer unit 216, allowing selectable two wheel drive or four wheel drive operation. In certain instances, and as is well known in the art, transfer box 216 may be configured to operate in either a high range (HI) or low range (LO) gear ratio, which may be adjustable by driveline subsystem $12_4$ itself and/or by another component of vehicle 10, such as, for example, VCU 16. Those having ordinary skill in the art will appreciate that driveline subsystem $12_4$ may be provided according to any number of different embodiments, may be connected in any number of different configurations, and may include any number of different components, like sensors (e.g., HI/LO ratio sensor, transmission gear ratio sensors, etc.), control units, and/or any other suitable components known in the art. Accordingly, the present disclosure is not limited to any one particular driveline subsystem.

In addition to those subsystems described above, vehicle 10 may further comprise any number of other or additional subsystems, such as, for example, a brake subsystem $12_3$ and a steering subsystem $12_5$. For the purposes of this disclosure, each of the aforementioned subsystems 12, and the functionality corresponding thereto, is conventional in the art. As such, detailed descriptions will not be provided; rather, the structure and function of each identified subsystem 12 will be readily apparent to those having ordinary skill in the art.

In any event, in one embodiment, one or more of subsystems 12 may be under at least a certain degree of control by VCU 16. In such an embodiment, those subsystems 12 are electrically coupled to, and configured for communication with, VCU 16 to provide feedback to VCU 16 relating to operational or operating parameters of the vehicle, as well as to receive instructions or commands from VCU 16. Taking powertrain subsystem 12$_1$ as an example, powertrain subsystem 12$_1$ may be configured to gather various types of information relating to certain operating parameters thereof, such as, for example, torque output, engine or motor speed, etc., and to then communicate that information to VCU 16. This information may be gathered from, for example, one or more of vehicle sensors 14 described below. Powertrain subsystem 12$_1$ may also receive commands from VCU 16 to adjust certain operating parameters when, for example, a change in conditions dictates such a change (e.g., when a change in vehicle speed has been requested via a brake pedal (pedal 18 in FIG. 1) or accelerator pedal (pedal 20 in FIG. 1) of vehicle 10). While the description above has been with particular reference to powertrain subsystem 12$_1$, it will be appreciated that the same principle applies to each such other subsystem 12 that is configured to exchange information/commands with VCU 16.

Each subsystem 12 may comprise a dedicated electronic control unit (ECU) that is configured to receive and execute instructions or commands provided by VCU 16, and/or to perform or control certain functionality independent from VCU 16. Alternatively, two or more subsystems 12 may share a single ECU, or one or more subsystems 12 may be directly controlled by the VCU 16 itself. In an embodiment wherein a subsystem 12 communicates with VCU 16 and/Of other subsystems 12, such communication may be facilitated via any suitable connection, such as, for example, a controller area network (CAN) bus, a system management bus (SMBus), a proprietary communication link, or through some other arrangement known in the art.

It will be appreciated that the foregoing represents only some of the possibilities with respect to the particular subsystems of vehicle 10 that may be included, as well as the arrangement of those subsystems with VCU 16. Accordingly, it will be further appreciated that embodiments of vehicle 10 including other or additional subsystems and subsystem/VCU arrangements remain within the spirit and scope of the present disclosure.

Vehicle sensors 14 may comprise any number of different sensors, components, devices, modules, systems, etc. In one embodiment, some or all of sensors 14 may provide subsystems 12 and/or VCU 16 with information or input that can be used by the present method, and as such, may be electrically coupled (e.g., via wire(s) or wirelessly) to, and configured for communication with, VCU 16, one or more subsystems 12, or some other suitable device of vehicle 10. Sensors 14 may be configured to monitor, sense, detect, measure, or otherwise determine a variety of parameters relating to the operation and configuration of vehicle 10, and may include, for example and without limitation, any one or more of: wheel speed sensors; ambient temperature sensors; atmospheric pressure sensors; tyre pressure sensors; gyro sensors to detect yaw, roll, and pitch of the vehicle; vehicle speed sensors; a longitudinal acceleration sensor; an engine torque sensor; a driveline torque sensor; a throttle valve sensor; a steering angle sensor; a steering wheel speed sensors; a gradient sensor; a lateral acceleration sensor on the stability control system (SCS); a brake pedal position sensor; brake pedal pressure sensor; an accelerator pedal position sensor; air suspension sensors (i.e., ride height sensors); wheel position sensors; water detection sensors (for both proximity and depth of wading events); a transfer case HI-LO ratio sensor; an air intake path sensor; and longitudinal, lateral, and vertical motion sensors, among others known in the art.

The sensors identified above, as well as any other sensors that may provide information that can be used by the present method, may be embodied in hardware, software, firmware, or some combination thereof. Sensors 14 may directly sense or measure the conditions for which they are provided, or they may indirectly evaluate such conditions based on information provided by other sensors, components, devices, modules, systems, etc. Further, these sensors may be directly coupled to VCU 16 and/or to one or more of vehicle subsystems 12, indirectly coupled thereto via other electronic devices, vehicle communications bus, network, etc., or coupled in accordance with some other arrangement known in the art. Some or all of these sensors may be integrated within one or more of the vehicle subsystems 12 identified above, may be standalone components, or may be provided in accordance with some other arrangement. Finally, it is possible for any of the various sensor readings used in the present method to be provided by some other component, module, device, subsystem, etc. of vehicle 10 instead of being directly provided by an actual sensor element. For example, VCU 16 may receive certain information from the ECU of a subsystem 12 rather than directly from a sensor 14. It should be appreciated that the foregoing scenarios represent only some of the possibilities, as vehicle 10 is not limited to any particular sensor(s) or sensor arrangement(s), but rather any suitable embodiment may be used.

VCU 16 may comprise any suitable ECU, and may include any variety of electronic process devices, memory devices, input/output (I/O) devices, and/or other known components, and perform various control and/or communication related functions. In one embodiment, VCU 16 includes an electronic memory device 22 that may store various sensor readings (e.g., such as those generated by vehicle sensors 14), look-up tables or other data structures, algorithms (e.g., the algorithms embodied in the method described below), etc. Memory device 22 may also store pertinent characteristics and background information pertaining to vehicle 10 and subsystems 12. VCU 16 may also include an electronic processing device 24 (e.g., a microprocessor, a microcontroller, an application specific integrated circuit (ASIC), etc.) that executes instructions for software, firmware, programs, algorithms, scripts, applications, etc. that are stored in memory device 22 and may govern the methods described herein. As described above, VCU 16 may be electronically connected to other vehicle devices, modules, subsystems, and components (e.g., sensors) via suitable vehicle communications and can interact with them when required. In addition to the functionality that may be performed by VCU 16 described elsewhere herein, in one embodiment, VCU 16 may also be responsible for various functionality described above with respect to subsystems 12, especially when those subsystems are not also configured to do so. These are, of course, only some of the possible arrangements, functions, and capabilities of VCU 16, as other embodiments could also be used. Depending on the particular embodiment, VCU 16 may be a stand-alone vehicle electronic module, may be incorporated or included within another vehicle electronic module (e.g., in one or more of the subsystems 12 identified above), or may be otherwise arranged and configured in a manner known in the art. Accordingly, VCU 16 is not limited to any one particular embodiment or arrangement.

In addition to the components and systems described above, in one embodiment, vehicle 10 may further comprise one or more vehicle speed control systems. For example and with continued reference to FIG. 2, in one embodiment, vehicle 10 may further comprise a cruise control system 26, also referred to as an "on-highway" or "on-road" cruise control system, and a low-speed progress (LSP) control system 28.

On-highway cruise control system 26, which may comprise any number of conventional cruise control systems known in the art, is operable to automatically maintain vehicle speed at a desired "set-speed" set by the user. Such systems are generally limited in their use in that the vehicle must be traveling above a certain minimum threshold speed (e.g., 30 mph (approximately 50 kph)) for the system to be operable. As such, these systems are particularly suited for use in highway driving, or at least driving wherein there is not a lot of repeated starting and stopping, and that permits the vehicle to travel at a relatively high speed. As is known in the art, on-highway cruise control system 26 may include a dedicated or standalone ECU configured to execute and perform the functionality of the system, or alternatively, the functionality of cruise control system 26 may be integrated into another subsystem 12 of vehicle 10 (e.g., powertrain subsystem $12_1$), or for example, VCU 16 (as is illustrated in FIG. 2).

Figure 3:
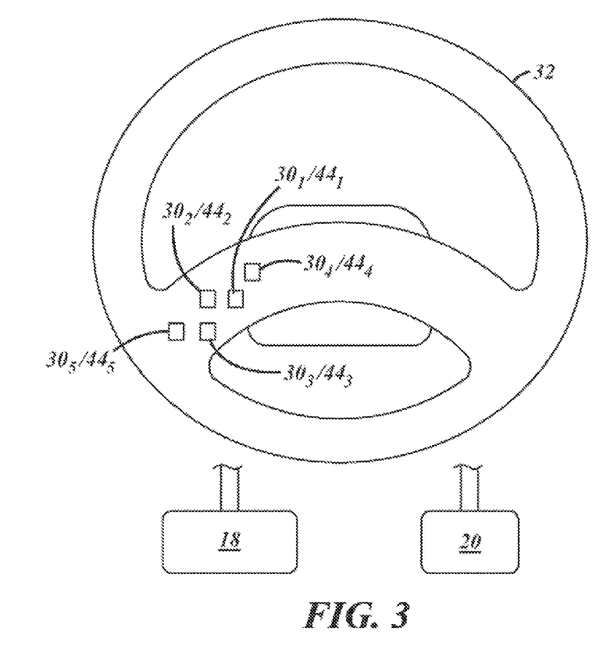
FIG. 3 is a diagram of a steering wheel for use with a vehicle, such as the vehicle illustrated in FIGS. 1 and 2.

Further, and as is known in the art, cruise control system 26 may include one or more user interface devices 30 that may be used by the user (e.g., driver) to interact with system 26 (e.g., the ECU thereof), and in certain embodiments, that allow the system to interact with the user. For example, these devices may allow a user lo activate/deactivate system 26 and set and/or adjust the set-speed of the system, to cite a few possibilities. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, etc.). For instance, and with reference FIG. 3, the steering wheel of vehicle 10 (i.e., steering wheel 32 in FIG. 1) may be configured with a plurality user interface devices of cruise control system 28 in the form of pushbuttons. One such device may be a "set speed" button $30_1$ that when manipulated in a particular manner may activate the operation of cruise control system 26 and also set the desired set-speed. Cruise control system 26 may further comprise one or more other user-selectable interface devices (e.g., buttons) to allow the user to increase or decrease the set-speed of the system. For example, a "+" button $30_2$ may be provided to allow the user to increase the set-speed in discrete increments (e.g., 1 mph, or 1 kph, for example, for vehicles with speed displayed in metric units), and a "−" button $30_3$ to allow the user to decrease the set-speed in the same discrete increments. Alternatively, the "+" and "−" buttons $30_2$, $30_3$ may be integrated into a single user-selectable device. Additional user-selectable interface devices of system 26 may include, for example, a "cancel" button $30_4$ to deactivate or suspend the system, as well as a "resume" button $30_5$ to allow for the system to be re-activated following a temporary suspension or deactivation of the system function.

It should be appreciated that the foregoing scenarios represent only some of the possibilities of cruise control system 26 and the user interface devices thereof, as vehicle 10 is not limited to any particular cruise control system or user interface device or arrangement; rather, any suitable embodiments may be used.

LSP control system 28 provides a speed control system that enables, for example, the user of a vehicle equipped with such a system to select a very low target speed or set-speed at which the vehicle can progress without any pedal inputs being required by the user. This low-speed progress control function differs from that of cruise control system 26 in that unlike cruise control system 26, the vehicle need not be traveling at relatively high speeds (e.g., 30 mph (approximately 50 kph)) for the system to be operable (although system 28 may be configured to facilitate automated speed control at speeds from rest to around 30 mph (approximately 50 kph) or more, and therefore, is not limited to "low speed" operation). Furthermore, known on-highway cruise control systems are configured so that in the event the user depresses the brake or the clutch pedals, for example, the cruise control function is cancelled and the vehicle reverts to a manual mode of operation requiring user pedal input to maintain vehicle speed. In addition, in at least certain cruise control systems, the detection of a wheel slip event, which may be initiated by a loss of traction, may also have the effect of cancelling the cruise control function. LSP control system 28 may also differ from such cruise control systems in that, in at least one embodiment, it is configured in such a way that the speed control function provided thereby is not cancelled or deactivated in response to those events described above.

In one embodiment, LSP control system 28 includes, among potentially other components, an ECU 42 (shown, in the illustrated embodiment and for reasons described below, as comprising VCU 16) and one or more user input devices 44. ECU 42 may include any variety of electronic processing devices, memory or storage devices, input/output (I/O) devices, and any other known components, and may perform any number of functions of LSP control system 28, including those described below and embodied in the present method. To that end, ECU 42 may be configured to receive information from a variety of sources (e.g., vehicle sensors 14, vehicle subsystems 12, user input devices 44) and to evaluate, analyze, and/or process that information in an effort to control or monitor one or more operational aspects of vehicle 10, such as, for example, predicting the occurrence of certain events and then automatically selecting and requesting changes in driveline gear ratios in response thereto, determining the type and characteristics of the terrain over which vehicle 10 is traveling, etc. Further, in one embodiment, ECU 42 is configured to carry out or perform one or more steps of the present method described in greater detail below. It should be appreciated that ECU 42 may be a standalone electronic module or may be integrated or incorporated into either another subsystem 12 of vehicle 10 or, for example, VCU 16. For purposes of illustration and clarity, the description below will be with respect to an embodiment wherein the functionality of ECU 42 is integrated or incorporated into VCU 16, such that, as illustrated in FIG. 2, VCU 16 comprises the ECU of LSP control system 28. Accordingly, in such an embodiment VCU 16, and a memory device thereof or accessible thereby (e.g., memory device 22), in particular, stores various information, sensor readings, look-up tables or other data structures, algorithms, software, and the like, required for performing the functionality of LSP control system 28, including that embodied in the method described below.

As with on-highway cruise control system 26 described above, LSP control system 28 further comprises one or more user interface devices 44 that may be used by a user to interact with the system 28, and in certain embodiments, to allow the system 28 to interact with the user. These devices may allow the user to, for example, activate/deactivate LSP control system 28, set and/or adjust the set-speed of the system, select a desired set-speed from a plurality of pre-defined set-speeds, switch between two or more predefined set-speeds, and otherwise interact with system 28 as may be described below. These user interface devices may also allow for system 28 to provide certain notifications, alerts, messages, requests, etc. to the user. Each of these devices may take any number of forms, such as, for example and without limitation, one or mere of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, etc.). In one embodiment, user interface devices 30, 44 of on-highway cruise control system 26 and LSP control system 28, respectively, are arranged adjacent to one another within vehicle 10, and, in one embodiments on steering wheel 32 of vehicle 10. However, in other embodiments, such as, for example, that described herein, on-highway cruise control system 26 and LSP control system 28 may share some or all of the same user interface devices. In such an embodiment, an additional user-selectable device, such as a switch, pushbutton, or any other suitable device may be provided to switch between the two speed control systems. Accordingly, in the embodiment illustrated in FIG. 3, those user interface devices $30_1$-$30_5$ described above with respect to cruise control system 26 may also be used in the operation of LSP control system 28, and as such, may also be referred to as user interface devices $44_1$-$44_5$ when discussed in the context of system 28.

For purposes of illustration and in addition to the functionality of LSP control system 28 described below, a description of the general operation of one embodiment of LSP control system 28 will now be provided. First, VCU 16, which in the embodiment described herein comprises the ECU of LSP control system 28, determines the desired speed at which the vehicle is to travel (referred to herein as "the desired set-speed"). This may be a set-speed selected by the user via user interlace devices 44, or alternatively, VCU 16 may be configured to automatically determine or select a desired set-speed based on certain conditions or factors and without any user involvement. In either instance, in response to the selection of the desired set-speed, VCU 16 is configured to cause the vehicle to operate in accordance with the desired set-speed by effecting the application of selective powertrain, traction control, and/or braking actions to the wheels of the vehicle, collectively or individually, to either achieve or maintain the vehicle at the desired set-speed. In one embodiment, this may comprise VCU 16 generating and sending appropriate commands to the appropriate subsystems 12 (such as powertrain subsystem $12_1$ and brake subsystem $12_3$), for example, and/or directly controlling the operation of one or more components, modules, subsystems, etc. of vehicle 10.

Figure 4:
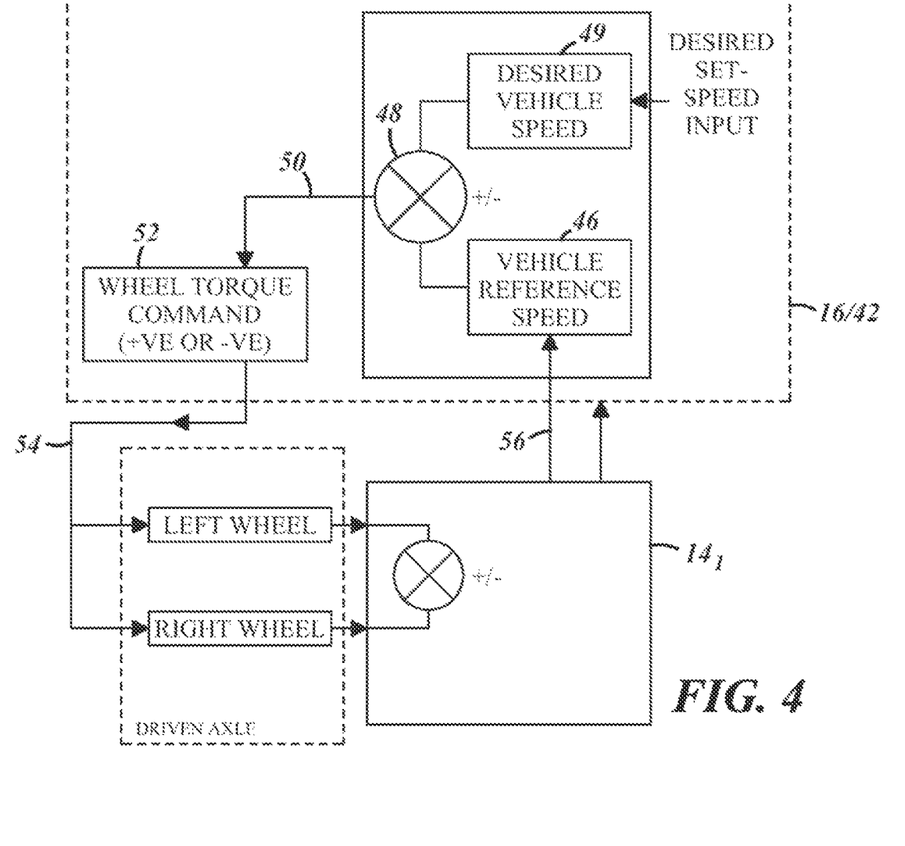
FIG. 4 is a schematic and block diagram illustrating the operation of a speed control system of a vehicle, such as the vehicle illustrated in FIGS. 1 and 2.

More particularly, and with reference to FIG. 4, once the desired set-speed is determined, a vehicle speed sensor (identified as sensor 14, in FIG. 4) associated with the vehicle chassis or driveline provides a signal 46 indicative of vehicle speed to VCU 16. In one embodiment, VCU 16 includes a comparator 48 which compares the desired set-speed (represented with reference numeral 49 in FIG. 4) with the measured speed 46, and provides an output signal 50 indicative of the comparison. The output signal 50 is provided to an evaluator unit 52, which interprets the output signal 50 as either a demand for additional torque to be applied to the vehicle wheels by, for example, powertrain subsystem $12_1$, or for a reduction in torque to be applied to the vehicle wheels, by, for example, brake subsystem $12_3$, depending on whether the vehicle speed needs lo be increased or decreased to maintain or achieve the desired set-speed. An output 54 from the evaluator unit 52 is then provided to one or more subsystems 12 so as to manage the torque applied to the wheels, depending on whether there is a positive or negative demand for torque from the evaluator unit 52. in order to initiate the necessary positive or negative torque being applied to the wheels, the evaluator unit 52 may either command that additional power is applied to the vehicle wheels or that a braking force is applied to the vehicle wheels, either or both of which may be used to implement the change in torque that is necessary to achieve or maintain the desired vehicle set-speed. In certain instances, VCU 16 may also receive a signal 56 indicative of a wheel slip event having occurred. In such embodiments, during a wheel slip event, VCU 16 continues to compare the measured vehicle speed with the desired set-speed, and continues to control automatically the torque applied across the vehicle wheels so as to maintain vehicle speed at the desired set-speed and manage the slip event.

In addition to the functionality described above, in one embodiment, LSP control system 28 may be further configured to detect, sense, or otherwise determine information relating to the terrain over which vehicle 10 is traveling (e.g., terrain type, surface classification, terrain roughness, etc.). In accordance with one embodiment, VCU 16, may be configured to perform this function and to do so in a number of ways. One such way is that described in UK Published Application No. GB2492748A published on 16 Jan. 2013, the entire contents of which is incorporated herein by reference. More particularly, in one embodiment, information relating to a variety of different parameters associated with the vehicle are received or acquired from a plurality of vehicle sensors and/or various vehicle subsystems, including, for example, some or all of those sensors 14 and/or subsystems 12 described above. The received information is then evaluated and used to determine one or more terrain indicators, which may represent the type of terrain and, in certain instances, one or more characteristics thereof, such as, for example, the roughness of the terrain.

Information received may include, for example, a signal indicative of the terrain in which the vehicle is travelling. Each of the different driving conditions with which the different subsystem control modes is associated may therefore be representative of or appropriate for at least one terrain type. For example, grass, gravel and snow may be associated with one of the subsystem control modes and mud and ruts may be associated with another of the subsystem control modes.

The control modes may include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode) which is a suitable compromise mode, or general mode, for all terrain conditions and especially vehicle travel on motorways and regular roadways.

Information received may also include an indication of the nature of the terrain roughness in which the vehicle is travelling. For example, the vehicle may be travelling on-road (e.g. on a regular smooth road surface), where the surface roughness is low. Conversely, if the vehicle is travelling off-road, the surface roughness is relatively higher.

More specifically, in one embodiment, the speed control system (e.g., VCU 16) may include an evaluation means in the form of an estimator module to which the information acquired or received from one or more sensors 14 and/or subsystems 12 (collectively referred to as "sensor/subsystem outputs" below) is provided. Within a first stage of the estimator module, various ones of the sensor/subsystem outputs are used to derive a number of terrain indicators. In the first stage, vehicle speed is derived from wheel speed sensors, wheel acceleration is derived from wheel speed sensors, the longitudinal force on the wheels is derived from a vehicle longitudinal acceleration sensor, and the torque at which wheel slip occurs (if wheel slip occurs) is derived from a powertrain torque signal provided by the powertrain subsystem and additionally or alternatively from a torque signal provided by the driveline subsystem (e.g., transmission), and from motion sensors to detect yaw, pitch and roll. Other calculations performed within the first stage of the estimator module include the wheel inertia torque (the torque associated with accelerating or decelerating the rotating wheels), "continuity of progress" (the assessment of whether the vehicle is repeatedly starting and stopping, for example as may be the case when the vehicle is traveling over rocky terrain), aerodynamic drag, and lateral vehicle acceleration.

The estimator module also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from a steering wheel sensor and/or steering column sensor), the wheel longitudinal slip (based on the longitudinal force on the wheels, the wheel acceleration, stability control system (SCS) activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface). The SCS activity signal is derived from several outputs from the ECU of a stability control system (SCS), which contains a dynamic stability control (DSC) function, a terrain control (TC) function, anti-lock braking system (ABS) and bill descent control (HDC) algorithms, indicating DSC activity, TC activity, ABS activity, brake interventions on individual wheels, and powertrain torque reduction requests from the SCS ECU to the powertrain subsystem. All these indicate a slip event has occurred and the SCS ECU has taken action to control it. The estimator module also uses the outputs from wheel speed sensors and in a lour wheel vehicle, compares outputs across each axle and from front to rear on each side, to determine a wheel speed variation and corrugation detection signal.

In one embodiment, and in addition to the estimator module, a road roughness module may also be included for calculating the terrain roughness based on air suspension sensors (the ride height sensors) and wheel accelerometers. In such an embodiment, a terrain indicator signal in the form of a roughness output signal is output from the road roughness module.

In any event, the estimates for the wheel longitudinal slip and the lateral friction estimation are compared with one another within the estimator module as a plausibility check. Calculations for wheel speed variation and corrugation output, the surface rolling resistance estimation, the wheel longitudinal slip and the corrugation detection, together with the friction plausibility check, are then output from the estimator module and provide terrain indicator output signals, indicative of the nature of the terrain over which the vehicle is traveling, for further processing by VCU 16. For example, the terrain indicators may be used to determine which of a plurality of vehicle subsystem control modes (e.g., terrain modes) is most appropriate based on the indicators of the type of terrain over which the vehicle is traveling, and to then automatically control the appropriate subsystems 12 accordingly.

In another embodiment, rather than LSP control system 28 performing the above-described terrain sensing/detecting functionality, another component, module, or subsystem of vehicle 10, such as, for example VCU 16 (In the case where it does not perform the functionality of LSP control system 28), chassis management subsystem 12$_2$, or another suitable component may be appropriately configured to do so, and such other embodiments remain within the spirit and scope of the present disclosure. Further, if should be appreciated that the foregoing description of the arrangement, functionality, and capability of LSP control system 28 has been provided for purposes of example or illustration only and is not meant to be limiting in nature. Accordingly, LSP control system 28 is not intended to be limited to any one particular embodiment or arrangement.

Once again, the preceding description of vehicle 10 and the illustrations in FIGS. 1 and 2 are only intended to illustrate one potential vehicle arrangement and do so in a general way. Any number of other vehicle arrangements and architectures, including those that differ significantly from the one shown in FIGS. 1 and 2, may be used instead.

Figure 5:
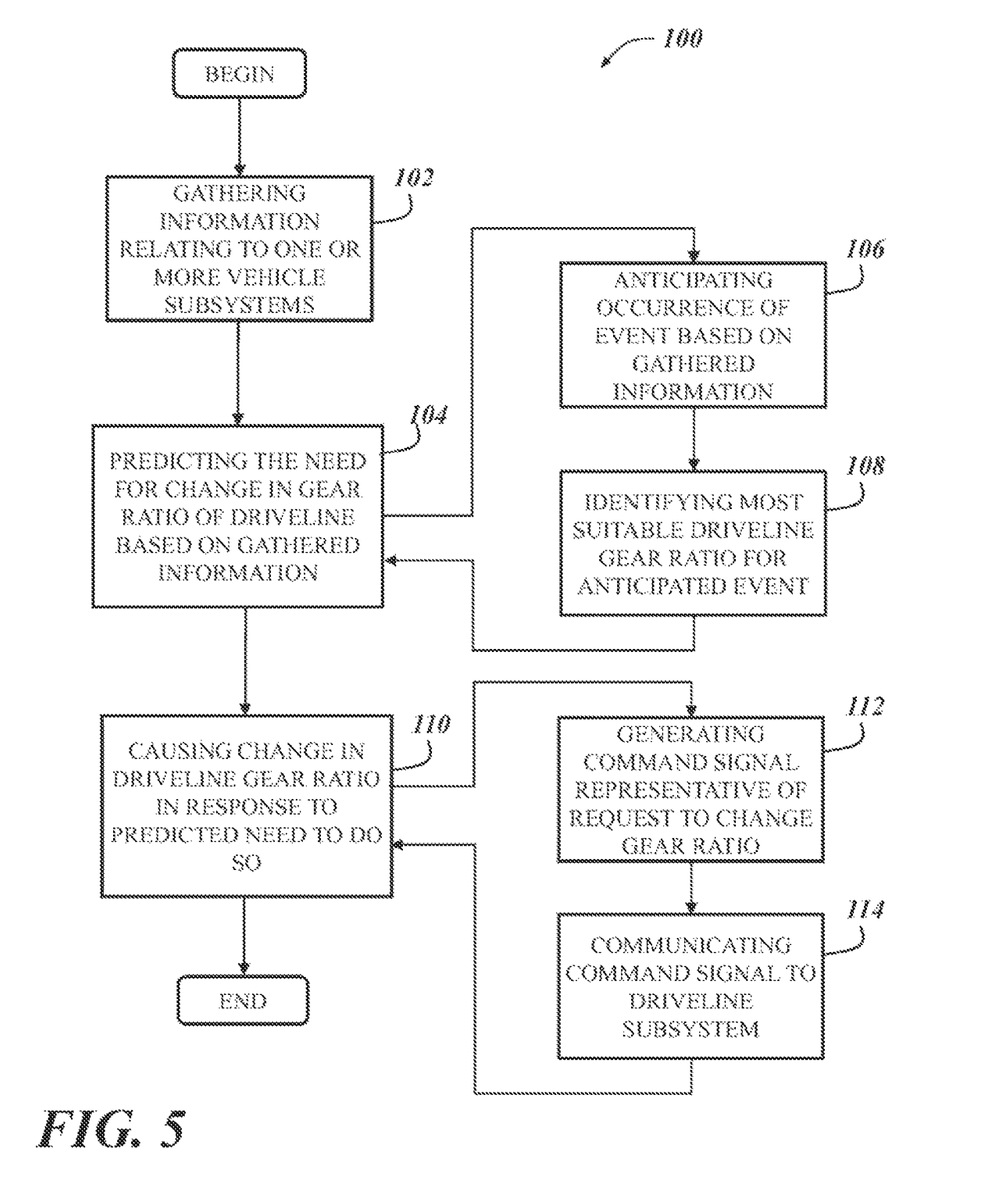
FIG. 5 is a flow diagram of one example of a method for selecting a vehicle driveline gear ratio.

Turning now to FIG. 5, there is shown an example of a method 100 for selecting a gear ratio for vehicle driveline. Although not limited to such an application, the present method may find particular applicability in use with a speed control system of a vehicle. To that end, and for purposes of illustration and clarity, method 100 will be described in the context of vehicle 10 illustrated in FIGS. 1 and 2 and described above, and more specifically, the low-speed progress (LSP) control system 28 thereof, in particular (which, in an embodiment, is integrated in VCU 16 of vehicle 10 (i.e., VCU 16 comprises ECU 42 of speed control system 28)). It will be appreciated, however, that the application of the present methodology is not meant to be limited solely to such an arrangement, but rather method 100 may find application with any number of other vehicles and/or speed control system arrangements, including, for example, LSP control systems other than that described above (e.g., not integrated within the VCU of a vehicle, and/or the VCU does not comprise the ECU of the speed control system), as well as, in certain instances, conventional "on-highway" or "on-road" cruise control systems, such as, for example, cruise control system 26 described above. Accordingly, the present disclosure is not meant to be limited to any one particular arrangement or type of vehicle or speed control system. Additionally, it will be appreciated that the performance of method 100 is not meant to be limited to any one particular order or sequence of stops.

With reference to FIG. 5, in one embodiment, method 100 comprises a step 102 of gathering information relating to one or more parameters associated with the vehicle. This information may include, for example: information relating to the actual speed of the vehicle and/or the desired set-speed of the speed control system; information relating to the attitude of the vehicle; information relating to the prevailing terrain or that allows for a determination to be made as to the type (and characteristics) of the prevailing terrain; and information relating to any number of operational or operating parameters of the vehicle, such as, for example, current powertrain output torque, wheel articulation, tyre friction, rolling resistance, and operating mode (e.g., terrain mode), among others. Accordingly, it will be appreciated that the present disclosure is not limited to any particular type of information, rather any information associated with the vehicle that may be useful in performing the steps of method 100 described below may be gathered.

In any event, the gathered information may be acquired or obtained from various sources. For instance, one or more vehicle subsystems (e.g., chassis management subsystem, driveline subsystem, powertrain subsystem, etc.) may be configured to receive readings or signals from one or more vehicle sensors and to then derive the information from or using those readings or signals. The speed control system, in an embodiment, may then obtain or acquire that derived information from the corresponding subsystem (s). In another instance, the speed control system may be configured to receive the information directly from one or more vehicle sensors, or to derive it from readings or signals received from that or those sensors.

For example, and in accordance with one embodiment wherein VCU 16 is configured to perform step 102, VCU 16 may gather information relating the attitude of the vehicle from, for example, the chassis management subsystem $12_2$ and/or one or more of vehicle sensors 14 (e.g., gyro sensors or gradient sensors, which may be integrally formed within an inertial measurement unit or IMU, not shown), and may gather information relating to powertrain torque input from, for example, the powertrain subsystem $12_1$ and/or one or more vehicle sensors 14 (e.g., engine torque sensor). VCU 16 may also derive information relating to vehicle speed from one or more vehicle sensors 14, such as, for example, wheel speed sensors or vehicle speed sensors, and also acquire information relating to the terrain in the manner described above with respect to LSP control system 28. Accordingly, it will be appreciated the information gathered in step 102 may be done so in any number of ways, including, but not limited to those described above, and that the present disclosure is not intended to be limited to any particular way.

Method 100 further comprises a step 104 of predicting, based on the gathered information, whether there is a need for a change in a prevailing or current gear ratio of the driveline, which may be the gear ratio of the transmission, the gear ratio of the transfer case, or both. As illustrated in FIG. 5, step 104 may comprise one or more substeps. In one embodiment, step 104 includes a first substep 106 of anticipating, based on the gathered information, an occurrence of an event relating to the vehicle for which a change in gear ratio is needed or would be advantageous, and may include a second substep 108 of identifying the most suitable driveline gear ratio for that anticipated event.

The occurrence of any number of events may be anticipated in substep 106 using the information gathered in step 102. One event may be a change in the speed of the vehicle (e.g., a prospective reduction in speed). A change in vehicle speed may be anticipated in response to a user-initiated change in the set-speed of the speed control system via a user interface device, or the speed control system automatically or autonomously determining that a change is needed or necessary for one reason or another (e.g., due to, for example, a change in type or characteristic of the prevailing terrain. In either instance, the nature of the prospective speed change may be such that a different gear ratio would be better suited for the new speed than the current gear ratio would be. As such, a change in speed may be an event relating to the vehicle for which a change in gear ratio may be advantageous, and therefore, an event that may be worth anticipating.

Another event that may be anticipated is a change in the terrain over which the vehicle is traveling. More particularly, using the technique described above with respect to LSP control system 28, or any other suitable technique, a change in the type or one or more characteristics of the terrain may be determined by the speed control system, and this change may be such that a gear ratio other than the current one would be better suited to maintain the speed of the vehicle at a desired speed during and/or after the change in terrain. For example, as a vehicle negotiates an obstacle, such as, for example, a boulder or steps, a large amount of torque may be required to lift or carry the vehicle up the obstacle. However, as the vehicle crests the obstacle, the amount of torque needed to maintain the vehicle speed at the speed control system set-speed progressively lessens. As the torque demand drops, the rotational momentum of powertrain (e.g., engine or motor) holds the torque output artificially high until the powertrain has time to slow down. The response lag of the powertrain may manifest itself as vehicle overrun, potentially causing the vehicle lurch over the obstacle and therefore further causing the vehicle to travel too quickly and/or causing the rear wheels to come into contact with the obstacle aggressively, all of which may adversely affect the composure of the vehicle and the comfort of the occupant(s). In such instances, a change in the gear ratio may be helpful to eliminate or at least reduce the potential for these adverse affects. As such, a change in terrain may be an event relating to the vehicle for which a change in gear ratio may be advantageous, and therefore, an event worth anticipating.

While only certain events have been identified and described above, it will be appreciated that other events may also be well suited for application of the present method, and as such, the present disclosure is not meant to be limited to any particular event(s).

In any instance, once the occurrence of an event for which a change in gear ratio is needed (and/or would be advantageous) has been anticipated, step 108 of identifying the most suitable driveline gear ratio for negotiating that event is performed. Step 108 may be performed in a number of ways.

For example, in an instance wherein an anticipated change in speed (e.g., set-speed) is involved, step 108 may comprise determining the new gear ratio for the "new" speed. In an embodiment, a reduction in set-speed may signify that the vehicle is about to negotiate an obstacle/rough terrain, or a steep incline, and so step 108 may comprise identifying an appropriate gear ratio, in this case, an increased gear ratio, in order to ensure sufficient drive torque is available to negotiate the obstacle, albeit at a lower speed. In one such embodiment, step 108 may comprise using, for example, one or more data structures or other prescribed profiles that either alone or in combination provide a correlation between speed and gear ratio. Alternatively, any other suitable means or technique known in the art may be used. For example, step 108 may utilize comparisons made between the current speed and a desired set-speed, or the current speed a predicted speed (in the instance where the speed control system intends to slow the vehicle (e.g., to a stop or near stop) such as when the vehicle is cresting an obstacle), and use those comparisons in determining an appropriate gear ratio in any suitable way. Step 108 may also involve selecting a gear ratio appropriate for optimal performance on the current/detected new terrain onto which the vehicle has just driven. In either instance, step 108 may be performed using the techniques described herein or any other suitable techniques. Accordingly, it will be appreciated that the present disclosure is not limited to the use of any particular means or technique.

In an instance wherein a change in terrain is involved, step 108 may comprise identifying the new gear ratio by first determining the amount of torque that will be needed to maintain the speed in view of the prevailing terrain, and to then determine a gear ratio that corresponds to that required torque. This may be done using any suitable technique such as, for example, utilizing one or more data structures or other prescribed profiles that either alone or in combination provide a correlation between gear ratio, torque, and/or speed. Alternatively, any other suitable means or techniques known in the art may be used; the present disclosure net being limited to any particular means or techniques. In an embodiment, VCU 18 is configured to perform step 104, including, for example, one or both of substeps 106, 108.

Following the identification of a suitable gear ratio in step 108, and therefore, a prediction of a need for a change in the gear ratio, method 100 comprises a step 110 of causing or effecting a change in the appropriate driveline gear ratio (e.g., in the gear ratio of the transmission or that of the transfer case). Step 110 may comprise one or more substeps. For instance, in one embodiment, step 110 may comprise a substep 112 of generating a command signal representative of a request to automatically change the gear ratio from the current or existing gear ratio (i.e., a first gear ratio) to the identified gear ratio (i.e., a second gear ratio). Step 110 may further comprise another substep 114 of communicating the command signal generated in substep 112 directly or in directly to the driveline subsystem of the vehicle, and the ECU thereof, in particular. In one embodiment, substeps 112, 114 are performed prior to the occurrence of the event anticipated in substep 106 of predicting step 108, while in another embodiment they may be performed during the occurrence of the event. In both instances, however, the requested change may be considered to be a proactive request, or a request to proactively change the gear ratio. This is because the request and corresponding change are made to the driveline from, for example, the speed control system, and either before or during the occurrence of the anticipated event. As such, compensation for a change in driveline torque associated with the transmission changing gear ratios, which is typically required and is reactionary to the occurrence of an event that necessitates a change in gear ratio, is no longer required or needed. By proactively changing, or causing to changed, the gear ratio in the proactive manner described above, the gear ratio change may be smooth, and so virtually and potentially imperceptible to the user, which serves to enhance vehicle composure and wear, as well as occupant comfort, among other attributes. In an embodiment, VCU 16 is configured to perform step 110 and therefore substeps 112 and 114.

In certain embodiments, method 100 may further comprise one or more additional steps, some or all of which may be optional depending on the particular implementation. For example, in one embodiment, method 100 may comprise a step (not shown) of determining when it is most appropriate to make the requested gear ratio change (e.g., the optimal time). This determination may be based on one or more factors or conditions that may have a bearing on whether it is an opportune time to make the requested change. One such factor or condition that may be taken into account, though certainly not the only factor/condition, is the current or expected amount of load on the on the driveline. More particularly, if the load on the driveline is relatively high when the request is communicated in step 114, one or more subsystems of the vehicle, e.g., the powertrain or driveline subsystems, may advise the speed control system (e.g., VCU 16) that it is not an optimal time to change the gear ratio. In response, the speed control system may instruct the driveline subsystem to not make the requested change at that time, and may further command that certain adjustments be made to one or more subsystems in order to make the conditions more optimal for a gear ratio change. For example, and in an embodiment wherein there is a relatively high torque load on the driveline when a gear ratio change is requested, this may include commanding a momentary adjustment in commanded torque to relieve the driveline of existing torque.

One way this may be done is by matching the speeds of the input and output shafts of the driveline before and during a gear ratio change. The shaft speeds may be matched by, for example, commanding a sufficient amount of positive and/or negative torque from the powertrain and brake subsystems, respectively, at the same time or different times. By matching the shaft speeds, the net torque on the driveline may be reduced to a negligible magnitude, thereby making it a more optimal time to perform the change in gear ratio.

Another way this may be done, which may be particularly suited for an instance wherein the gear ratio change relates to the transfer case, although not limited to such an instance, is that a momentary shift into a neutral gear may be commanded which would have the effect of relieving the torque load in the driveline, resulting in more optimal conditions for a gear ratio change and avoiding, or at least limiting possible, torque shunt and the effects thereof. Additionally, or alternatively, a clutch or other means to disconnect the driveline may be automatically opened, at least partially, to relieve the driveline torque. In an instance wherein the driveline is disconnected or opened, full control over the vehicle may still be maintained by the speed control system, as if is well suited to maintain control over vehicle progress by monitoring wheel speed and vehicle acceleration, and controlling wheel torque via automated brake intervention. In this way, the vehicle will not accelerate or change direction, e.g., rolling backwards down a hill, in an unintentional or uncontrolled manner.

Therefore, in any of the above examples, when the speed control system determines, based on feedback from one or more of the driveline subsystem, the powertrain subsystem, and/or one or more other vehicle subsystems, that the driveline has been sufficiently relieved of torque, it may once again request the gear ratio change and thus cause the change to be made smoothly and without noticeable torque shunt that may adversely affect, for example, vehicle composure and driver comfort.

By way of example, and in an embodiment wherein VCU 16 is configured to perform the functionality described above, VCU 16 may determine that a gear ratio change in transmission 200 of driveline subsystem $12_4$ is needed and may then communicate a request to driveline subsystem $12_4$ to effect the required change. This request may be broadcast on, for example, a CAN bus, and therefore, may be received by driveline subsystem 12₄ and possibly other subsystems 12 coupled to the CAN bus. Following the communication of the request, driveline subsystem 12₄, or, in certain instances, one or more other subsystems such as powertrain subsystem 12₁, may determine that the current conditions of driveline subsystem 12₄ are such that it is an inopportune time to make the requested change. For example, driveline subsystem 12₄ may determine, based on the input shaft speed of transmission 200, that the toque load is currently too high. Alternatively, this determination may be made by powertrain subsystem 12₁ based on the output shaft speed of the engine or motor 202 that drives the input shaft of transmission 200. In any event, this information may be communicated back to VCU 16, which may then instruct driveline subsystem 12₄ to ignore or suspend the request, and may then determine what adjustments, need to be made to optimize the conditions for performing the gear ratio change. This may entail, for example, commanding powertrain subsystem 12₁ to apply additional torque (positive torque) and/or commanding brake subsystem 12₃ to apply the brakes (negative torque) in order to match the speeds of the input and output shafts of transmission 200 to relieve the torque. Once it is determined that the conditions have become more optimal VCU 16 may then once again request the gear ratio change, which may thee be effected or carried out by driveline subsystem 12₄.

While certain conditions or factors that render the driveline ill-suited for a gear ratio change at a particular time, and certain techniques for addressing or improving those conditions, have been described above, it will be appreciated that various other adverse conditions may exist, and/or various other techniques for addressing any such conditions, may be used in addition to or instead of these described above. Accordingly, the present disclosure is not meant to be limited any one particular Embodiment.

In addition to the speed control system being configured to, as described above, automatically select and request a gear ratio change, another aspect of the present disclosure is that the speed control system may be further configured to intervene in a driveline or transmission-initiated gear shift or gear ratio change. More particularly, in certain instances, a driveline-initiated change may not be advisable in view of the current terrain over which the vehicle is traveling. For example, when traveling over a particularly rough terrain, the user may inadvertently or mistakenly manipulate a shift mechanism (e.g., shift paddle) located in the vehicle cabin that would cause an unwanted gear shift if executed. In other instances, the driveline initiated change may conflict with a change the speed control system has identified using, for example, the method described above. In either instance, the speed control system may be configured to intervene in the driveline initiated change, suspending if until the vehicle has, for example: negotiated a particular obstacle or terrain; complied with a command by the user; or ignoring it altogether and, for example, executing the speed control system command. For instance, in response to a manual gear shift, the speed control system may consider the steering wheel angle using, for example, readings from one or more vehicle sensors (e.g., a steering wheel angle sensor) and the prevailing terrain at the moment the gear shift input is received, and may seek to determine if that input was intentional. The speed control system may intervene if it determines, based on the terrain and/or the steering angle, that the shift is inappropriate or was unintentional. It may then generate an advisory notice via a suitably configured user interface device to the user to explain the vehicle behavior and give the driver the option to override a countercommand generated by the speed control system via a double shift request on the paddles, for example.

In any event, the occurrence of unwanted gear shifts or gear ratio changes may be avoided or a least limited. Accordingly, the speed control system may receive information from the driveline subsystem that a gear ratio change has been requested, and it may then intervene and instruct the driveline subsystem to either ignore the request, or at least temporarily suspend it until a more appropriate time or until such a request has been confirmed. In an embodiment, the aforedescribed functionality may be performed by, for example, VCU 16 and, in certain instances, VCU 16 and one or more of user interface devices 44.

It will be understood that the embodiments described above are given by way of example only and are not intended to limit the invention, the scope of which is defined in the appended claims. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance" "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Further, the terms "electrically connected" or "electrically coupled" and the variations thereof are intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A method for selecting a gear ratio of a vehicle driveline, comprising:
 gathering information relating to one or more parameters associated with the vehicle, the information comprising information relating to the nature of a terrain over which the vehicle is traveling;
 anticipating, based on the gathered information, an occurrence of an event relating to the vehicle for which a change in driveline gear ratio is needed;
 identifying a suitable driveline gear ratio for the anticipated event;
 generating a command signal representative of a request to change the gear ratio of the driveline to the identified gear ratio; and
 communicating the command signal to a driveline subsystem of the vehicle,
 the method further comprising ignoring or suspending generation of the command signal representative of a request to change the gear ratio in dependence on the current or expected amount of load on the driveline and a roughness of a ground surface of the terrain over which the vehicle is travelling.

2. The method of claim 1, wherein the information gathered in the gathering step comprises information related to one of the actual speed of the vehicle and a desired vehicle speed.

3. The method of claim 1, wherein the driveline gear ratio comprises one of a transmission gear ratio and a transfer case gear ratio.

4. The method of claim 1, further comprising, when the command signal is ignored or suspended, relieving the driveline of existing torque therein prior to changing the driveline gear ratio, and then changing the driveline gear ratio to the identified gear ratio.

5. The method of claim 4, wherein the relieving step comprises matching the speeds of an input shaft and an output shaft of the driveline.

6. The method of claim 5, wherein the matching of the speeds of the input and output shafts comprises adding one or both of positive and negative torque to the driveline.

7. A method for selecting a gear ratio for a driveline of a vehicle, comprising:
gathering information relating to one or more parameters associated with the vehicle, the information comprising information relating to the nature of a terrain over which the vehicle is traveling;
predicting, based on the gathered information, a need for a change in the gear ratio of the driveline from a current first gear ratio to a second gear ratio; and
effecting the change to the driveline gear ratio to the second gear ratio in response to the predicted need to do so;
the method further comprising not effecting the change to the driveline gear ratio in dependence on the current or expected amount of load on the driveline and a roughness of a ground surface of the terrain over which the vehicle is travelling.

8. The method of claim 7, wherein the information gathered in the gathering step comprises one of the actual speed of the vehicle and a desired vehicle speed.

9. The method of claim 7, further comprising, when the change to the driveline gear ratio is not effected due to the current or expected amount of load on the driveline, relieving the driveline of existing torque therein prior to changing the driveline gear ratio.

10. The method of claim 7, wherein the driveline gear ratio comprises one of a transmission gear ratio and a transfer case gear ratio.

11. A system for selecting a gear ratio for a driveline of a vehicle, comprising:
an electronic control unit, configured to:
receive information relating to one or more parameters associated with the vehicle, the information comprising information relating to a terrain over which the vehicle is traveling;
predict, based on the gathered information, a need for a change in the gear ratio of the driveline from a current first gear ratio to a second gear ratio; and
effect the change in the driveline gear ratio to the second gear ratio in response to the predicted need to do so;
the electronic control unit being further configured not to effect the change in the driveline gear ratio in dependence on the current or expected amount of load on the driveline and a roughness of a ground surface of the terrain over which the vehicle is travelling.

12. The system of claim 11, wherein the electronic control unit is configured to effect the change in the driveline gear ratio by:
generating a command signal representative of a request to change the gear ratio of the driveline to the second gear ratio; and
communicating the command signal to a driveline subsystem of the vehicle.

13. The system of claim 11, wherein the electronic control unit is configured to predict the need for a change in the driveline gear ratio by anticipating, based on the received information, an occurrence of an event relating to the vehicle for which a change in the driveline gear ratio is needed.

14. The system of claim 11, wherein the electronic control unit comprises an electronic control unit of a speed control system of the vehicle.

15. The system of claim 11, wherein the information received by the electronic control unit comprises information relating to one of the actual speed of the vehicle and a desired vehicle speed.

16. The system of claim 11, wherein the electronic control unit is further configured to cause, when the change in the driveline gear ratio is not effected in dependence on the current or expected amount of load on the driveline, the driveline to be relieved of existing torque therein prior to the changing of the driveline gear ratio to the second gear ratio.

17. A vehicle comprising the system recited in claim 11.

18. The method of claim 1, further comprising determining the nature of the terrain has changed after the ignoring or suspending generation of the command signal, and initiating the requested gear ratio change in response to the determination that the nature of the terrain has changed.

19. The method of claim 1, further comprising determining the request to change the gear ratio was unintentional, based upon at least the nature of the terrain.

20. The method of claim 19, wherein the determination that the request to change the gear ratio was unintentional is based at least upon the roughness of the terrain.

21. The method of claim 1, wherein the roughness of the ground surface of the terrain includes at least an indication whether the ground surface is on-road or off-road.

* * * * *